(12) United States Patent
Nelson et al.

(10) Patent No.: US 10,031,821 B2
(45) Date of Patent: Jul. 24, 2018

(54) DISTRIBUTED NETWORK ELECTRONIC INTERFERENCE ABATEMENT SYSTEM AND METHOD

(71) Applicants: James Nelson, Jewell, KS (US); John Nelson, Redwood City, CA (US)

(72) Inventors: James Nelson, Jewell, KS (US); John Nelson, Redwood City, CA (US)

( * ) Notice: Subject to any disclaimer, the term of this patent is extended or adjusted under 35 U.S.C. 154(b) by 151 days.

(21) Appl. No.: 15/276,757

(22) Filed: Sep. 26, 2016

(65) Prior Publication Data

US 2018/0089043 A1    Mar. 29, 2018

(51) Int. Cl.
    *G06F 11/20*    (2006.01)
    *G06F 11/14*    (2006.01)

(52) U.S. Cl.
    CPC ........ *G06F 11/203* (2013.01); *G06F 11/1451* (2013.01); *G06F 11/1469* (2013.01); *G06F 2201/805* (2013.01); *G06F 2201/84* (2013.01)

(58) Field of Classification Search
    CPC .............................. G06F 11/203; G06F 11/00
    USPC ......................................................... 714/4.12
    See application file for complete search history.

(56) References Cited

U.S. PATENT DOCUMENTS

| | | | |
|---|---|---|---|
| 6,104,582 A * | 8/2000 | Cannon ..................... | G06F 1/26 361/1 |
| 6,412,074 B1 * | 6/2002 | Flannery ................... | G06F 1/26 709/217 |
| 6,674,625 B1 * | 1/2004 | Page ....................... | G01W 1/16 324/72 |
| 7,103,480 B2 | 9/2006 | Intrilligator et al. | |
| 8,044,810 B2 | 10/2011 | Delia et al. | |
| 9,274,250 B2 * | 3/2016 | Pasken ..................... | G01W 1/10 |
| 9,274,251 B2 * | 3/2016 | Pasken ..................... | G01W 1/00 |
| 9,285,504 B2 * | 3/2016 | Dannevik ................ | G01W 1/10 |
| 9,547,574 B2 * | 1/2017 | Meir ..................... | G06F 11/1441 |
| 9,613,271 B2 * | 4/2017 | Basu .................. | G06K 9/00536 |
| 2003/0051026 A1 * | 3/2003 | Carter ..................... | H04L 41/00 709/224 |
| 2003/0110396 A1 * | 6/2003 | Lewis ................. | H04L 63/0227 726/4 |
| 2003/0147192 A1 * | 8/2003 | Crocker ................... | H02H 5/00 361/79 |
| 2004/0015294 A1 * | 1/2004 | Kirtland ............... | G08B 27/006 702/2 |

(Continued)

*Primary Examiner* — Kamini B Patel
(74) *Attorney, Agent, or Firm* — Jonathan M. D'Silva; MMI Intellectual Property

(57) ABSTRACT

A system to protect and reconfigure a computer network in case of advance warning of a disruption event that would disrupt the operation of the computer network is presented. The system comprises a main control system (MCS) that comprises a software system that makes continuous local backups of data nodes, maintains a plurality of remote backups, and maintains an ordered list of the remote backups. With the first warning of the disruption event, the MCS: 1) locks down some virtual servers at each remote backup and secures a selected remote backup; 2) determines the expected start and end time of the disruption event; 3) warns users about the disruption event; 4) uses the selected remote backup to provide a local copy of the data nodes; and 5) shuts down vulnerable critical systems. When the disruption event occurs, the MCS promotes the selected remote backup to be the primary data node.

5 Claims, 4 Drawing Sheets

(56) References Cited

U.S. PATENT DOCUMENTS

| | | | |
|---|---|---|---|
| 2006/0010493 A1* | 1/2006 | Piesco | G06F 21/552 726/23 |
| 2007/0008104 A1* | 1/2007 | McBain | G08B 23/00 340/517 |
| 2007/0101430 A1* | 5/2007 | Raikar | H04L 51/12 726/24 |
| 2009/0276771 A1* | 11/2009 | Nickolov | G06F 9/4856 717/177 |
| 2012/0246730 A1* | 9/2012 | Raad | H04L 61/1511 726/25 |
| 2014/0101663 A1 | 4/2014 | Dickson | |
| 2014/0143863 A1* | 5/2014 | Deb | G06F 21/552 726/22 |
| 2014/0181040 A1* | 6/2014 | Montulli | G06F 11/1451 707/652 |
| 2014/0283035 A1* | 9/2014 | Sawhney | H04L 63/1483 726/22 |
| 2015/0213258 A1* | 7/2015 | Masui | G06F 21/45 726/6 |
| 2016/0092340 A1* | 3/2016 | Muske | G06F 11/3692 717/131 |

* cited by examiner

DISTRIBUTED NETWORK ELECTRONIC INTERFERENCE ABATEMENT SYSTEM AND METHOD

BACKGROUND

Disruption events such as earthquakes, solar flares, other natural and man-made events can have many effects on a computer network. The most damaging disruption events are events that generate an electromagnetic pulse (EMP). Disruption events that generate EMPs can occur in many forms, from a solar flare to a terrorist act. In any case, there might be advance warning of an incoming disruption event that could disrupt the operation of the computer network on the order of a few minutes to provide some time to act to prevent damage. When disruption events occur, a computer network would need to know how to restructure itself to deal with the damage. What is presented is a combined hardware and software system to protect and reconfigure a computer network in case of advanced warning of a disruption event that could damage the computer network. The system presented herein is a two pronged approach that both physically protects/hardens the hardware of the computer network and also protects the computer network against other uncontrolled third party software and hardware systems it may be dependent on.

SUMMARY

What is presented is a system to protect and reconfigure a computer network in case of advance warning of a disruption event that would disrupt the operation of the computer network that comprises a plurality of data nodes. The system comprises a hardened battery backup comprising a faraday cage and a main control system ("MCS"). The MCS comprises a software system that makes continuous local backups of the computer networks data nodes and also maintains a plurality of remote backups of the data nodes. The MCS keeps an ordered list of the plurality of remote backups. The MCS continuously cycles through the ordered list to determine the most capable of the remote backups.

With the first warning of the disruption event, the MCS:
1) initiates bids and locks down a small number of virtual servers at each remote backup and secures a selected remote backup;
2) determines the expected start and end time of the disruption event;
3) warns users of the system about the disruption event;
4) uses the selected remote backup to provide a local copy of the data nodes; and
5) shuts down critical systems incapable of withstanding the disruption event.

When the disruption event occurs, the MCS promotes the selected remote backup to be the primary data node.

In variations of the system, one of the plurality of remote backups is located on a set of local machines. In other variations, one of the plurality of remote backups is hosted by a third party remote system. One of the plurality of remote backups could also be set up in a hot-swap configuration.

The determination of the most capable of the remote backups can be based on the geographic location of the disruption event, the scope of the disruption event, the cost of each of the plurality of remote backups, or the availability of third party systems.

Those skilled in the art will realize that this invention is capable of embodiments that are different from those shown and that details of the devices, media and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
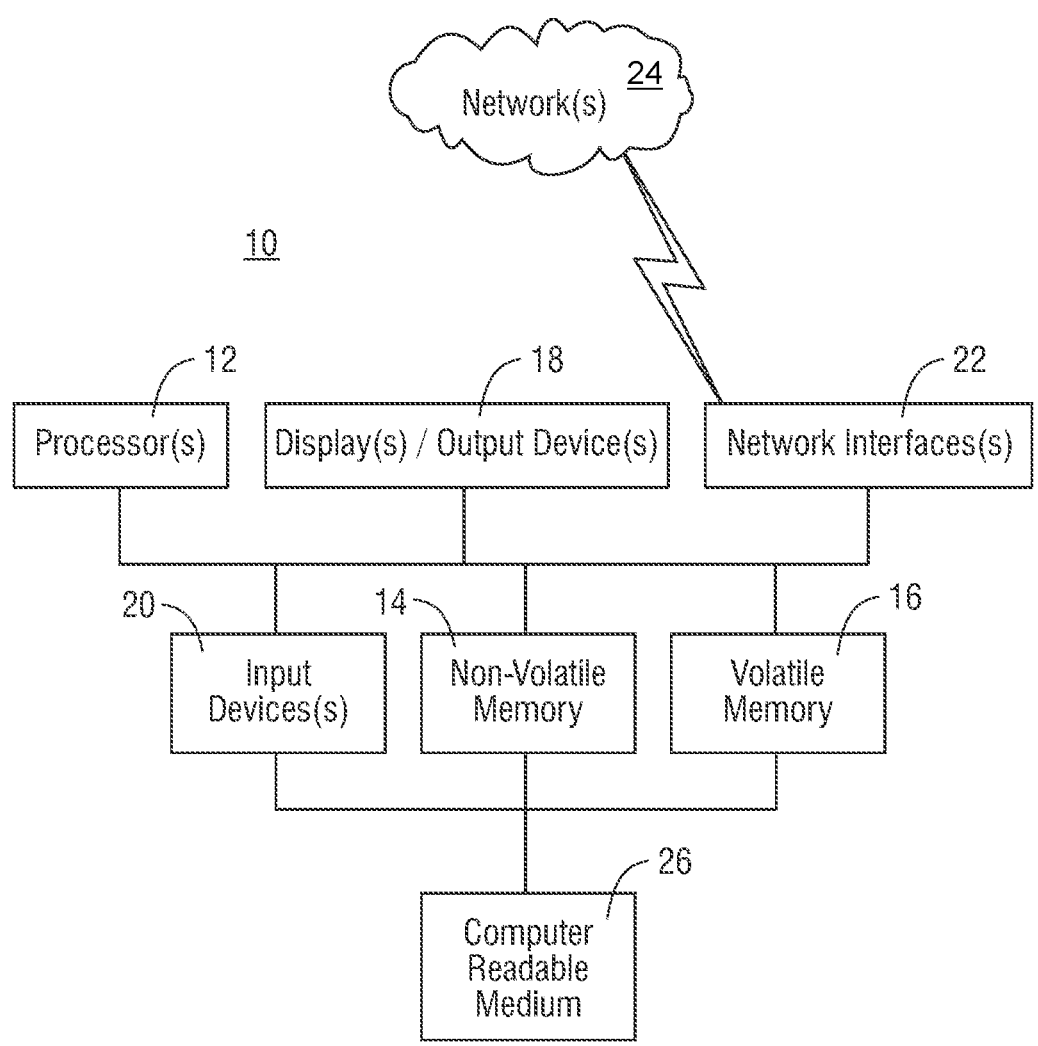
FIG. 1 is a block diagram of an embodiment of a computer system that can function in one or more embodiments disclosed herein.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Disruption events such as earthquakes, solar flares, other natural and man-made events can have many effects on computer network systems that are not physically hardened against them. Natural disasters such as earthquakes and floods could lead to loss of utility services including electricity and cutting the computer network from the internet. The most damaging disruption events are events that generate an electromagnetic pulse (EMP) which can damage electrical circuits and erase software and data that are not hardened or protected against them. Disruption events that generate EMPs can occur in many forms, from a solar flare to a terrorist act.

In any case, there might be advance warning of an incoming disruption event that could disrupt the operation of the computer network on the order of a few minutes to provide some time to act to prevent damage to the computer network. When disruption event occurs, a computer network would need to know how to restructure itself to deal with the damage. What is presented is a combined hardware and software system to protect and reconfigure a computer network in case of advanced warning of a disruption event that could damage the computer network. The system and method presented herein is a two pronged approach that both physically protects/hardens the hardware of the computer network and also protects the computer network against other uncontrolled third party software and hardware systems it may be dependent on.

FIG. 1 illustrates an exemplary computer system 10, through which embodiments of the disclosure can be implemented. The computer system 10 described herein is but one example of a suitable computing environment and does not suggest any limitation on the scope of any embodiments presented. Nothing illustrated or described with respect to the computer system 10 should be interpreted as being required or as creating any type of dependency with respect to any element or plurality of elements. In a basic embodiment, the computer system 10 often includes at least one processor 12 and memory (non-volatile memory 14 and/or volatile memory 16). The computer system 10 can include one or more displays and/or output devices 18 such as monitors, speakers, headphones, projectors, wearable-displays, holographic displays, and/or printers, for example. The computer system 10 may further include one or more input devices 20 which can include, by way of example, any type of mouse, keyboard, disk/media drive, memory stick/thumb-drive, memory card, pen, touch-input device, biometric scanner, voice/auditory input device, camera, etc. The computer system 10 typically includes non-volatile memory 14 (ROM, flash memory, etc.), volatile memory 16 (RAM, etc.), or a combination thereof. The computer system 10 can include one or more network interfaces 22 to facilitate communication between the computer system 10 and one or more additional devices, which may include, for example, client and/or server devices. A network interface 22 can facilitate communications over one or more networks 24 that may include any suitable type of public or private network, which by non-limiting example can include the internet, wireless networks, personal area networks (PAN), local area networks (LAN), wide area networks (WAN), municipal area networks (MAN), telephone networks, cable networks, fiber-optic networks, cellular networks, and/or satellite networks. All aforementioned devices, systems, connections, and/or accessories do not warrant further discussion as they are readily understood within the art.

A computer-readable medium 26 may comprise a plurality of computer readable mediums, each of which may be either a computer readable storage medium or a computer readable signal medium. A computer readable storage medium 26 may reside, for example, within an input device 20, non-volatile memory 14, volatile memory 16, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type.

A computer readable signal medium can include any type of computer readable medium that is not a computer readable storage medium and may include, for example, propagated signals taking any number of forms such as optical signals, electromagnetic signals, or a combination thereof. A computer readable signal medium may include propagated data signals containing computer readable code, for example, within a carrier wave.

Figure 2:
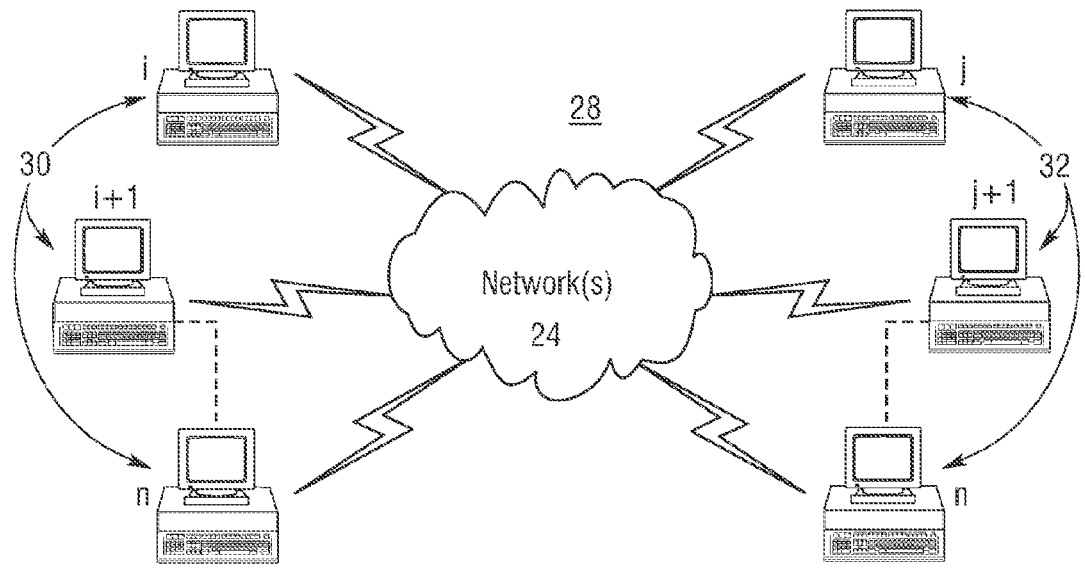
FIG. 2 is a block diagram of an exemplary computing network that can function in one or more of the embodiments described herein.

FIG. 2 illustrates an exemplary computer network 28 through which clients 30 can be coupled to one or more network(s) 24 with servers 32. Any respective quantities of client systems and server systems can be utilized. Clients 30 can include, for example, a computer system 10 as depicted in FIG. 1. Alternatively, a client 30 can utilize any other configuration disclosed herein or as would be well known to one of ordinary skill in the art. Similarly, any server 32 generally utilizes a computer system 10 as depicted in FIG. 1. Alternatively, a server 32 can utilize any other configuration disclosed herein or as would be well known to one of ordinary skill in the art. Further, a server 32 can be any known type of appropriate server, such as an application server, database server, etc. The network(s) 24 can be implemented with, by non-limiting example, the internet, wireless networks, personal area networks (PAN), local area networks (LAN), wide area networks (WAN), municipal area networks (MAN), telephone networks, cable networks, fiber-optic networks, cellular networks, and/or satellite networks.

As described, exemplary computer system 10 (shown in FIG. 1) and/or one or more components of a computer network 28 (shown in FIG. 2) may perform and/or constitute a means for performing, either alone or in combination with other elements, one or more steps of an exemplary embodiment described herein. Any memory component, for example non-volatile memory 14, volatile memory 16, and/or a computer-readable medium 26, as depicted in FIG. 1 with exemplary the computer system 10, can be utilized for distributed/cloud storage and/or retrieval. Any client 30 or server 32 can utilize one or more network interfaces 22 as described above, or any other suitable network interface 22. The computer network 28 shown in FIG. 2 need not be limited to the internet or any other particular type of network. Each client 30 and/or server 32 can utilize software, for example, a web browser, to remotely send and retrieve data with respect to any other connected device.

Any device disclosed herein need not be limited to the clients 30 and servers 32 depicted in the computer network 28 shown in FIG. 2. All or any portion of any exemplary embodiment may be encoded as computer code, stored in, and/or run by, one or more servers 32, and distributed over network(s) 24 to one or more clients 30, for example. The computer network 28 may perform and/or be a means for performing, either alone or in combination with any other element(s), one or more of the steps disclosed herein.

Computer systems that depend on other uncontrolled third party software and hardware systems include internet dependent systems such as those hosted in datacenters, medical networks within hospitals, and internet service providers (ISPs). These computer networks have many data nodes (customers) connected to them that are also susceptible to damage and disruption.

Preparing susceptible computer networks to respond to disruption events requires planning and implementation well before the disruption event occurs. When the disruption event happens, timing is of the essence to limit the damage imposed on the system. It is advisable to have as much done ahead of time as possible. Typically the physical hardening of the system cannot be implemented when the first warning of a disruption event occurs. There simply would not be enough time to react. Most physical hardening of the hardware components of the computer network are passive. Surge protectors may be installed to protect against power surges on the utility supplied electricity. In some cases large long pulses of electricity would require special slow burning fuses or circuit breakers to isolate sensitive internal wiring Large enough pieces of hardware may be enclosed within faraday cages (grounded copper mesh covering equipment)

to shield these items. Wiring not within the cages should be shielded against EMPs. In equipment not enclosed within faraday cages, specific equipment should be hardened or backed up to minimize or prevent data loss or loss of critical functions. For example, sensitive medical equipment should be shielded in case of EMPs, seismic events, or power surges; solid state memory in hard drives needs to be protected as well.

Seismic events caused by earthquakes or large explosions may physically move hardware and cause significant damage to internal components. Seismic isolators such as rubber mounts or other seismic dampening equipment should be installed on key pieces of sensitive equipment.

Most data centers have UPS (uninterruptible power supplies) which use batteries as backup and diesel after that. However these have been known to fail. In the event of a warning of a disruption event, best practice is to shut down critical hardware features and shunt operations to a secondary location.

With the hardware components address, 'active' software side protection is also included in the computer network to shut down critical systems and reroute/duplicate critical systems. During a disruption event, an operator of the computer network datacenter can only protect their own equipment, but they also rely upon external providers such as Amazon Web Services, S3, and Google APIs to allow access to a plethora of APIs and data sources that a computer network is dependent on to function.

A special battery backed up main control system (MCS) that has been hardened as described above is the core of the software side of the system. The MCS continuously makes local backups of each of the types of nodes (database, web) of the servers of the computer network. These backups will be both data and hardware configuration. So computer systems can be backed up after a disruption event but also duplicated in a virtual environment. The MCS also maintains copies of any nodes of computer systems hosted in any external datacenter or virtually within a specified plurality of other third party hosting companies (AWS). The MCS also creates backup copies of itself in a specified list of Virtual Hosting Systems in a hot-swap configuration. The MCS allows the user to configure a small version of these nodes to automatically be switched to in the event communications is cut to the main node. The MCS is configured with what third party APIs the network system relies on and continuously monitors these for availability.

Figure 3:
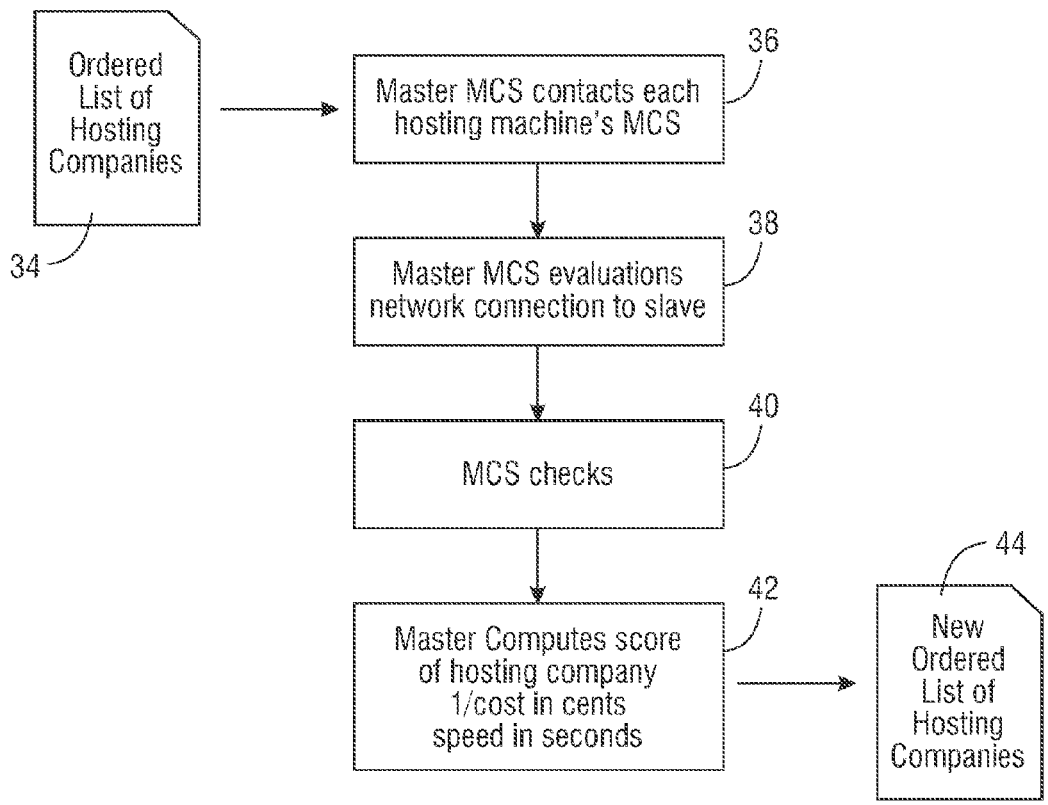
FIG. 3 is a flowchart showing how the main control system ("MCS") prioritizes the ordered list of hosting companies prior to the receipt of a first warning of a disruption event.

The flowchart in FIG. 3 shows how the MCS prioritizes the ordered list of hosting companies prior to the receipt of a first warning of a disruption event. Prior to any disruption event, the primary computer network is designated the "master" MCS and each copy of the computer network is designated as "slaves" that each have the potential to be promoted to "master" given the appropriate conditions. Starting with an initial ordered list of potential hosting companies 34, the master MCS contacts each slave MCS 36 and evaluates the network connection to it 38. The MCS conducts further checks of each slave 40 to determine the current cost of hosting a slave at the remote site with the particular hosting company. The MCS then computes a score for each hosting company 42 based on the cost of the hosting a remote backup at the hosting company and the speed of the network connection between the master and the slave. This score is assigned to the slave and the ordered list of hosting companies is updated with this new information 44.

Figure 4:
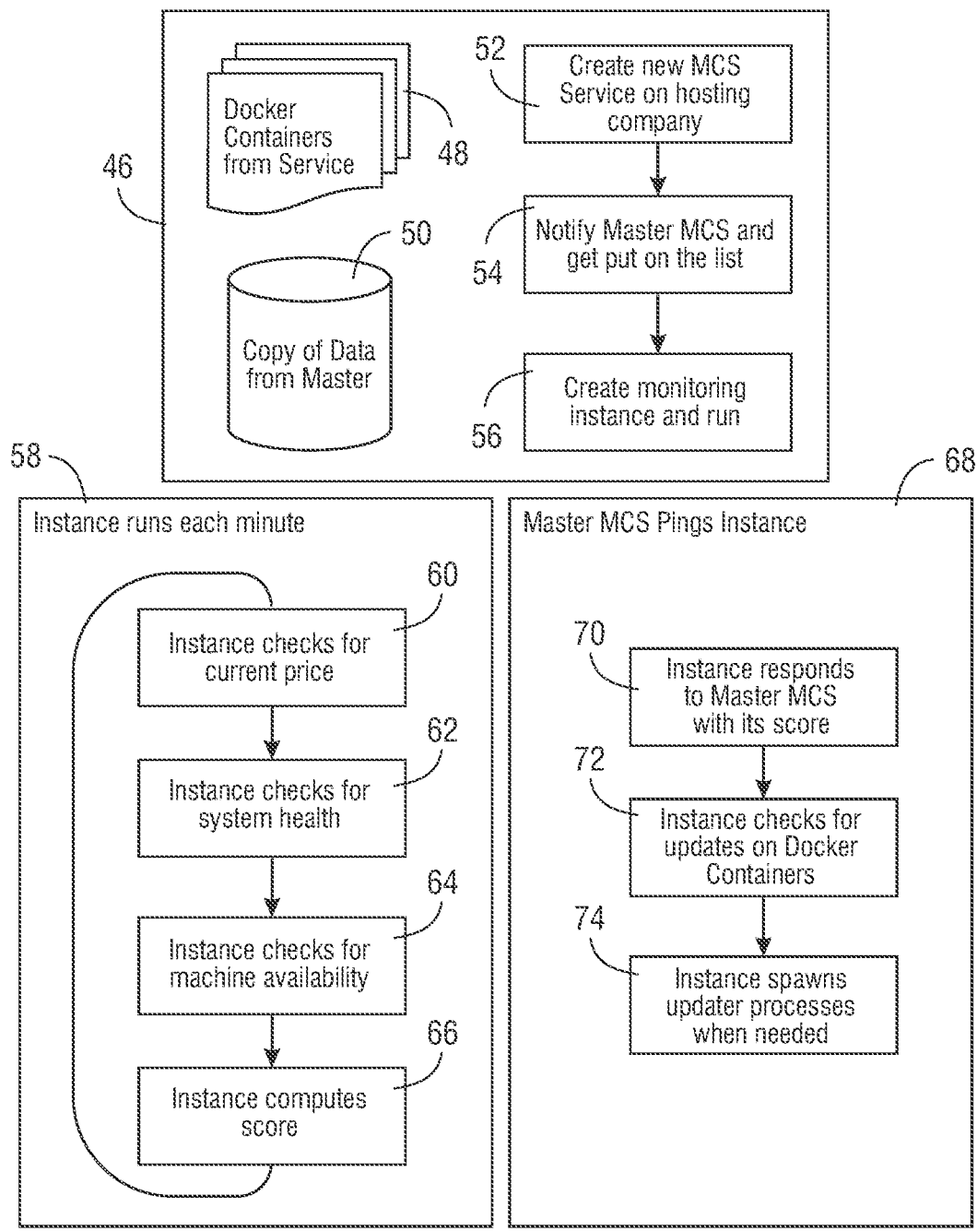
FIG. 4 is a series of flowcharts showing activities conducted at each slave site.

If a new hosting company is selected to be a remote backup site for the computer network, FIG. 4 shows the series of flow diagrams for activities conducted at each slave site. As a first activity 46, the new hosting company assigns Docket Containers 48 (essentially network resources to contain the master computer network backups) from its resource pool. A copy of data from the master computer network is obtained and stored 50. A new slave MCS is created on the hosting company site 52. The Master MCS is notified when the slave MCS is operational and it is placed on the ordered list of hosting companies 54 as described above. A monitoring subroutine 58 in then created and run 56.

The monitoring subroutine 58 runs a process check each minute. The instance first checks for the hosting service's current price 60 and then does a system check 62 to make sure the general health of the equipment in remote backup site. The instance checks for the availability of machine resources 64 at the remote backup site and then computes a score 66 for itself. When the master MCS conducts a check of the remote backup site (as noted in FIG. 3), it pings the instance which generates another instance of a sequence of actions 68 at the remote backup site. This new ping response instance first responds to the MCS with its last computed score 70 and then checks the updates to the remote backup data contained in the Docker Containers 72. The backup data is updated if needed 74.

Figure 5:
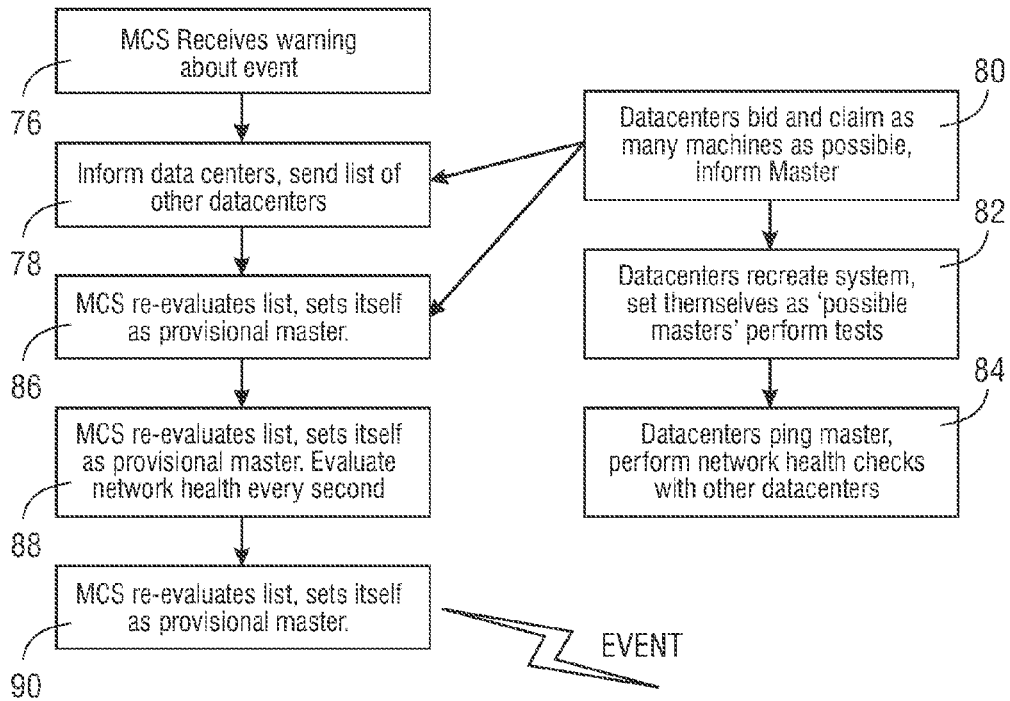
FIG. 5 is a flowchart that shows the steps that occurs when the MCS receives the first warning of a disruption event.

The scores that the MCS receives in the manner described allows the creation of a list of systems most capable of taking over operations from the computer network in case of a disruption event. As shown in FIG. 5, with the first warning of a disruption event 76, the MCS will begin contacting the remote backup sites that are on its list and provide each remote backup site with a list of all of the other remote backup sites 78 so that each may begin the response process. Each remote backup site begin bidding and claiming system resources at their hosting company location and informs the primary MCS of its status 80.

Each remote backup site recreates the main computer network 82, getting themselves ready as possible primary data node. The MCS will use the remote backup site's systems to start providing a local cached copy of frequently used third party APIs via caching. If it detects a drop in the availability of the third party APIs, this will be provided seamlessly to the remote backup sites by resetting a local DNS to point to the caching servers. (A lot of APIs don't allow 'caching', however in emergency circumstances when the API goes down, there may be wording in contracts to allow local caching, or caching of a 'good' configuration/ error message).

Each remote backup site repeatedly pings the MCS at the computer network, performs self-checks, and pings other remote backup sites from the list provided from the MCS 84. The MCS re-evaluates the list based on information from each remote backup site as it receives responses and sets itself up as a "provisional master" pending loss of network connectivity or loss of communications with the remotes sites 86. The primary MCS conducts a network and system check every second and re-evaluates the list of remote sites 88. The MCS will trigger a user specified software configuration that will enable the system to warn users about the incident and that it's entering a 'maintenance mode'. The MCS will automatically configure this notice with the expected start and end times of the event 90.

The MCS will also shut down critical systems not capable of withstanding the event. For example, databases will be powered down gracefully. If the computer network is in a hospital setting, MIll operators will be warned and/or the device will be shut down if in current use to protect the patient.

When the disruption event hits and computer network loses contact with the remotes backup sites, the remote backup site with the highest score will promote itself to be the master MCS and replicate a small working clone of the main system, slowly building its capabilities. Any available remote backup MCSs not designates as master will work as slaves building infrastructure within its environment to work as additional capacity, automatically determined by the cost and availability of virtual servers.

In small computer networks, this could bring back full functionality to a computer network in a different hosting environment. In large and complex systems, this will provide a maintenance page and web presence until the main system is able to be brought up.

Figure 6:
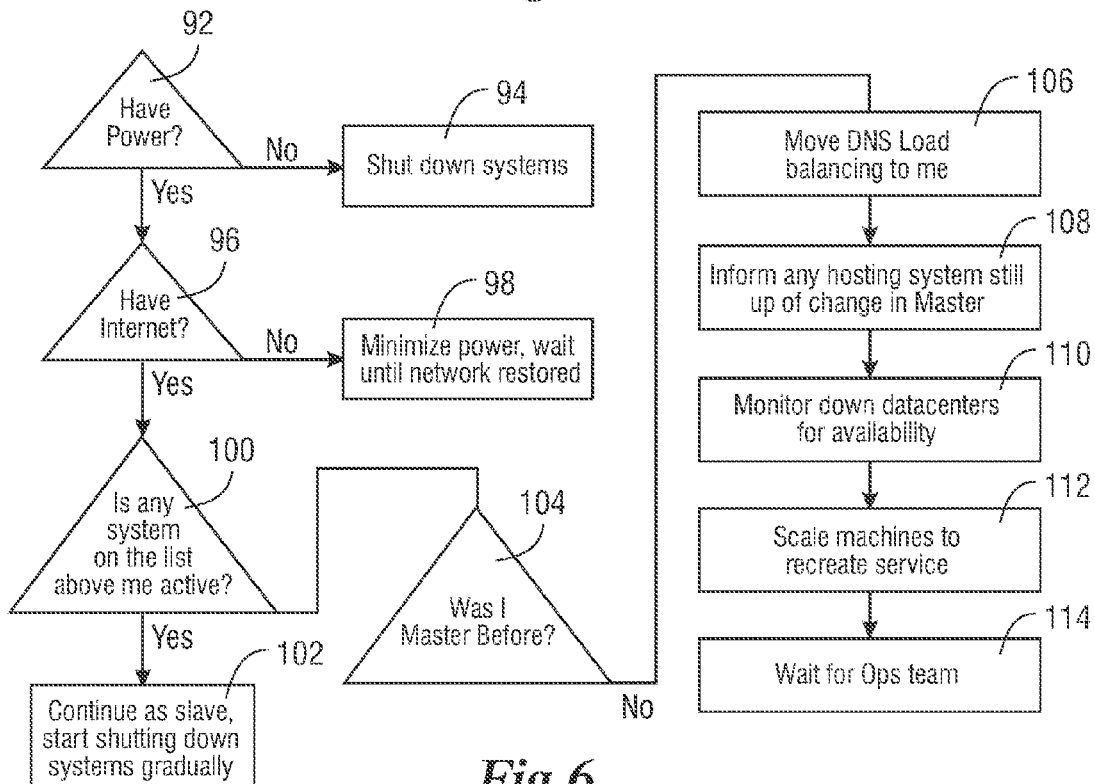
FIG. 6 illustrates the flowchart of events that occurs after the disruption event hits a computer network whether it is the primary MCS or a remote backup that has been set to primary or a slave remote backup.

FIG. 6 illustrates the flowchart of events that occurs after the disruption event hits a computer network whether it is the primary MCS or a remote backup that has been set to primary or a slave remote backup. The first step is to check for adequate power supply 92 and if none is found the MCS shuts down the computer network 94. If there is adequate power, the MCS checks for internet access 96. If no internet access is detected, the MCS shuts down unneeded resources to minimize power usage and waits until internet access is restored 98. If internet access exists, the MCS pings its list of remote sites to see and if any remote backup sites are active and if any of those are above the MCS on the ordered list 100. If any other MCS at a remote site returns a ping that places it above this MCS, the MCS continues to function as a slave MCS and shuts down computer network systems gradually to preserve power and resources 102. If there are no other remote sites that are higher than this MCS, then the MCS checks to see if it was a master MCS before 104.

If so, the MCS will attempt to restore the computer network to its previous known good system. It will check each system within its chosen host and verify the system's integrity. It will produce a report of any physical issues it finds. If it finds faults, it will remove those nodes for the computer network and any load balancers and try to replicate these using the virtual information above. If there were faults, the MCS will support a step that the operators will approve that the computer network is up and running before the MCS will then reroute internet traffic back to the original system, otherwise the rerouting will be automatic.

If the MCS was not a master MCS before, it will designate its computer network to move the DNS load to itself 106 and then inform all other active remote backup sites of its change in status as the master MCS 108. The now master MCS will monitor any remote sites that are down to check on their availability 110 especially in the case that the now master MCS is not running the original computer network—the goal being to restore the original computer network to its primary function. In the meantime, the now master MCS will scale its resources to recreate the services of the original computer network 112 and wait for operational network services teams 114 to restore service to the original computer network or reconfigure the systems as required.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A system to protect and reconfigure a computer network in case of advance warning of a disruption event that would disrupt the operation of the computer network, the computer network comprising a plurality of data nodes, the system comprising:
   a hardened battery backup comprising a faraday cage,
   a main control system comprising:
      a software system that makes continuous local backups of said data nodes;
      said software system maintains a plurality of remote backups of said data nodes; and
      an ordered list of said plurality of remote backups;
   said main control system continuously cycles through said ordered list to determine the most capable of said plurality of remote backups;
   with the first warning of the disruption event, said main control system:
      1) initiates bids and locks down a small number of virtual servers at each of said plurality of remote backups and secures a selected remote backup;
      2) determines the expected start and end time of the disruption event;
      3) warns users of the system about the disruption event;
      4) uses said selected remote backup to provide a local copy of said data nodes;
      5) shuts down critical systems incapable of withstanding the disruption event;
   when the disruption event occurs, said main control system promotes said selected remote backup to be the primary data node.

2. The system of claim 1 in which one of said plurality of remote backups is located on a set of local machines.

3. The system of claim 1 in which one of said plurality of remote backups is hosted by a third party remote system.

4. The system of claim 1 in which one of said plurality of remote backups is in a hot-swap configuration.

5. The system of claim 1 in which the determination of the most capable of said remote backups is based on the geographic location of the disruption event, scope of the disruption event, cost of each of the plurality of remote backups, or the availability of third party systems.

* * * * *